UNITED STATES PATENT OFFICE.

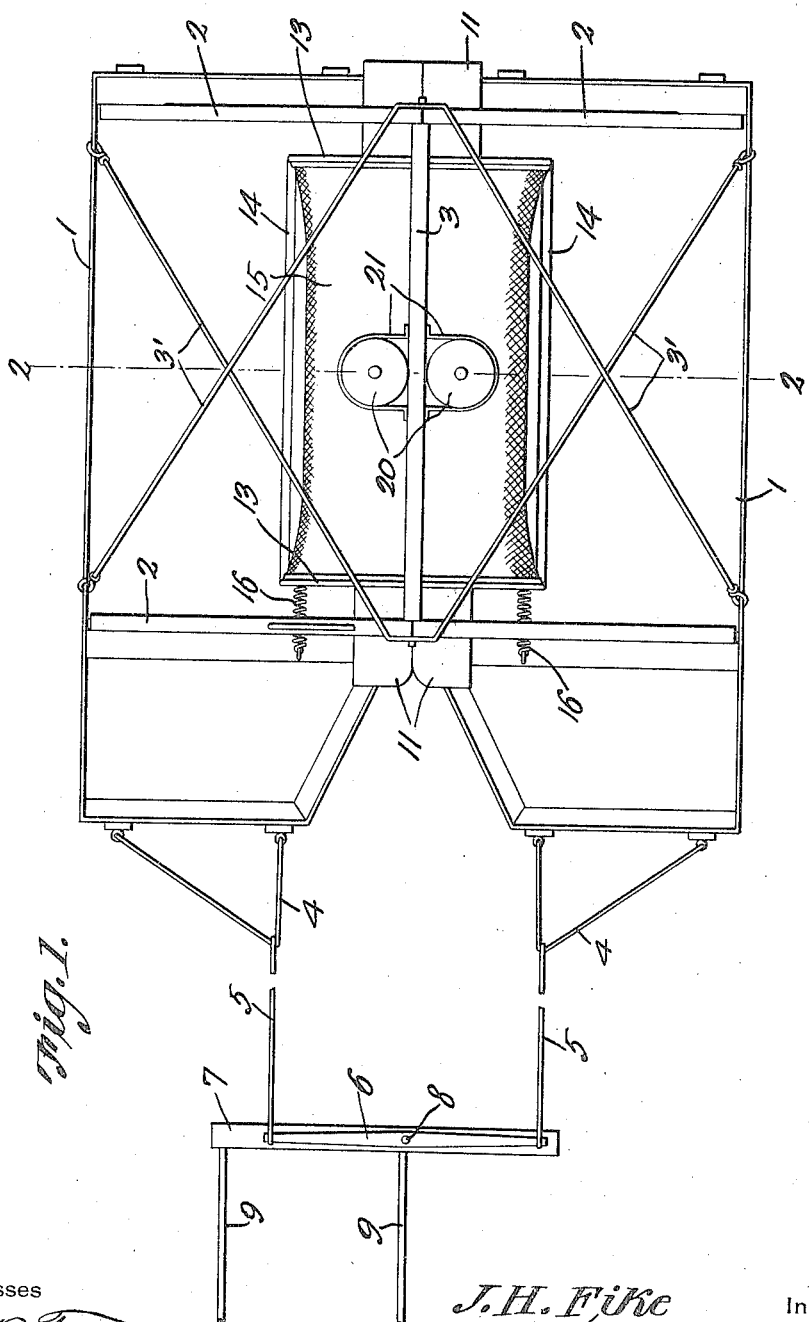

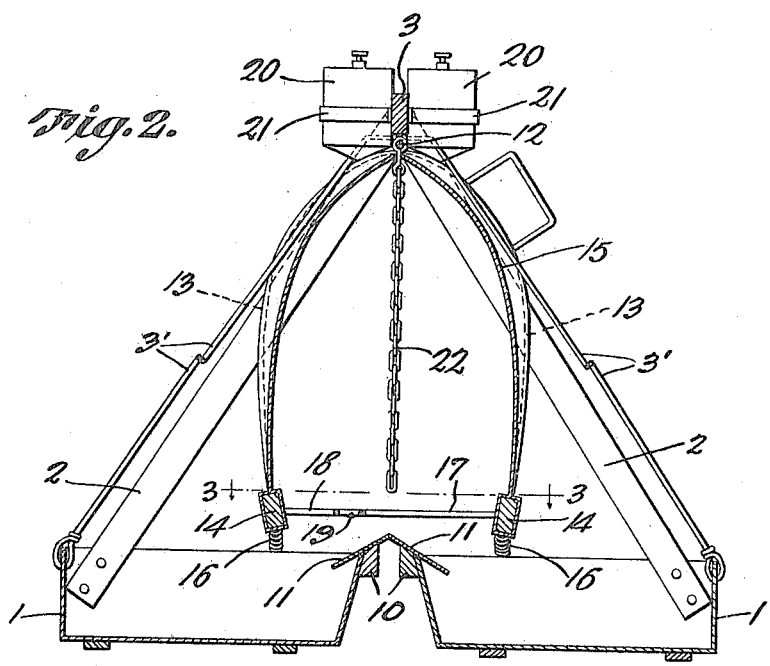
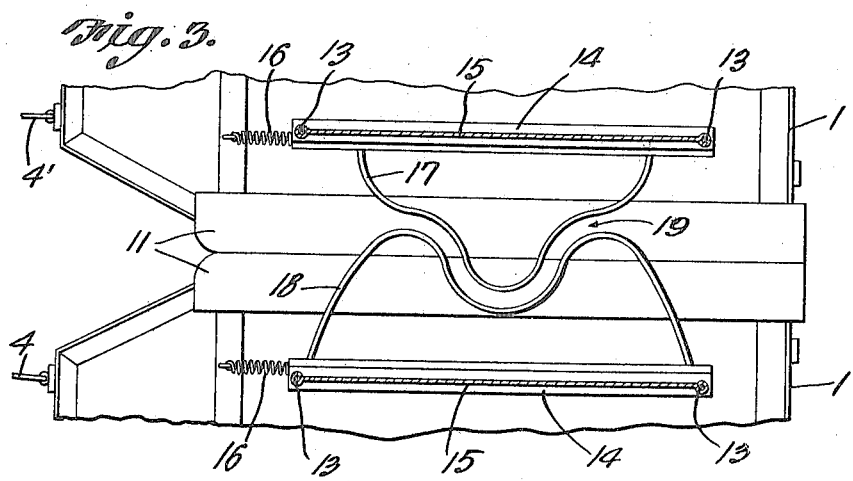

JAMES HOWARD FIKE, OF AUTAUGAVILLE, ALABAMA.

BOLL-WEEVIL AND SQUARE COLLECTOR.

1,213,087. Specification of Letters Patent. Patented Jan. 16, 1917.

Application filed October 2, 1916. Serial No. 123,334.

*To all whom it may concern:*

Be it known that I, JAMES HOWARD FIKE, a citizen of the United States, residing at Autaugaville, in the county of Autauga and State of Alabama, have invented a new and useful Boll-Weevil and Square Collector, of which the following is a specification.

The present invention appertains generally to insect collectors, and aims to provide a novel and improved device for collecting and exterminating boll weevil and squares from cotton plants.

It is the object of the invention to provide an insect collector of the nature indicated by means of which the boll weevil and squares can be gathered from the cotton plants in a facile and expeditious manner, the device being of novel construction to carry out the desired results in a most satisfactory manner.

Another object of the invention is to so construct the device that the cotton plants are so agitated as to knock the boll weevil either dead or alive, and the punctured squares off of the plants, and to prevent the escape of the boll weevil, the boll weevil and squares being destroyed to prevent further injury to the plants.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the apparatus. Fig. 2 is a cross section taken on the line 2—2 of Fig. 1. Fig. 3 is a horizontal section taken on the line 3—3 of Fig. 2.

In carrying out the invention, there is provided a pair of elongated pans 1 disposed side by side and having runners 1ª to move along the opposite sides of a row of cotton plants, and these pans contain coal oil or other liquid or material for destroying the boll weevil and squares which fall into the pans from the plants. The remote portions of the pans are connected by inverted V-shaped arches 2 having their terminals secured to the ends of the pans, and the apices of the arches 2 are connected by a longitudinal beam 3. Crossed diagonal stay rods 3' have their lower ends attached to the remote sides of the pans 1 and have their upper ends attached to the apices of the arches 2, and serve to steady the frame comprising said arches and beam. This arch-like frame is adapted to move astride the row of plants with the pans 1 at the opposite sides of the stalks.

The pans 1 are drawn by means of a horse over the ground, although the apparatus can be moved about in any other suitable manner, and as a convenient means for hitching a draft animal to the forward tapered ends of the pans 1, V-shaped attaching members 4 are attached to the forward ends of the pans, and have the flexible elements 5 connected to their crotch portions. The members 5 are attached to a cross piece 6, and an evener bar 7 is pivoted to said cross piece 6, as at 8, and has the thills 9 attached thereto and offset to one side of the row of plants whereby the animal can walk between the rows.

Longitudinal cleats or bars 10 are secured to the adjacent sides of the pan 1 adjacent the upper edges thereof, and are provided with upper beveled edges upon which rubber or other flexible flaps 11 are secured. Said flaps converge upwardly, or are inclined transversely to shed the boll weevil and squares into the pans, should the boll weevil or squares drop onto said flaps. The free edges of said flaps normally bear against one another, but said flaps are flexible away from one another to accommodate the stalks of the plants as the pans move along the sides of the plants. The flaps 11 thus serve to close the space between the pans, and prevent the boll weevil or squares from dropping between the pans. The flaps 11 are readily flexed out of the way by the plants so as not to interfere with the motion of the apparatus over the ground.

A longitudinal rod 12 is carried by the beam 3 immediately below the same, and a pair of inverted U-shaped rods or arches 13 of resilient material, have their upper intermediate portions engaging the rod 12 to suspend said arches from the beam 3 of the frame. The arches 13 are arranged adjacent to the ends of the frame, and the lower ends of the arches 13 are connected by longitudinal bars 14, to provide an arch-like frame for a porous sheet 15 of suitable fabric. Said sheet has its ends secured to the arches 13 and its edges secured to the bars 14 in any suitable manner, to provide an arch-shaped hood to pass astride the plants.

The forward ends of the bars 14 are connected by coiled wire springs 16 with the forward ends of the pans 1, whereby to hold the bars 14 yieldably in place, although they can yield in various directions if necessary.

A rod 17 has its terminals secured to one bar 14, and a complementing rod 18 has its terminals secured to the other bar 14, said rods 17 and 18 being provided with parallel sinuous or undulating portions providing a similarly shaped slot 19 therebetween for the passage of the stalks of the plants.

Tanks 20 for oil or other emulsion are attached to the beam 3 at opposite sides thereof by suitable clamps or clips 21, and are arranged to let the oil or emulsion drip onto the opposite sides of the sheet or hood 15, whereby the emulsion is taken up by said hood, to keep it saturated with the emulsion.

One or more chains or similar flexible elements 22 are suspended from the rod 12 within the hood to provide additional means for shaking the plants.

In operation, when the pans 1 are drawn over the ground, they pass along the opposite sides of the plants, and the flaps 11 are separated by the plants, said flaps being pressed together, however, between the plants to prevent the boll weevil and squares from dropping downwardly between the pans. Those boll weevil and squares which drop onto the flaps 11 will roll into the pans. The hood passes over the plants and being saturated with the emulsion, will serve to apply the emulsion to the plants, which is highly beneficial for destroying the boll weevil and squares, and furthermore, the hood being disposed over the flaps will prevent the escape of the boll weevil since they can not escape through the ends of the hood which are closed by the plants, and the boll weevil coming into contact with the saturated hood will drop into the pans 1. The rods 17 and 18 being drawn along the opposite sides of the plants above the flaps 11 will constrain the plants to move through the sinuous or undulating slot 19, thus shaking the plants from side to side, and dislodging the boll weevil and squares, which will drop into the pans. Furthermore, the chains 22 will drag over the plants to assist in shaking them. The arches 13 are resilient to enable the bars 14 and rods 17—18 to separate if necessary, and the present apparatus can readily pass over small as well as matured plants with equal success in removing the boll weevil and squares therefrom.

Having thus described the invention, what is claimed as new is:—

1. An insect collector embodying a pair of pans movable along opposite sides of a row of plants, an arch-like frame connecting said pans, an arch-like hood suspended from said frame to pass over the plants, means for shaking the plants within the hood to dislodge insects therefrom so that they drop into the pans, the hood embodying a sheet of absorbent material, and means for supplying an emulsion to said hood.

2. An insect collector embodying a pair of pans movable along opposite sides of a row of plants, an arch-like frame secured to and connecting said pans, an arch-like hood suspended from the upper portion of said frame to pass over the plants, the side portions of the hood hanging above the pans between the inner and outer sides thereof and being movable toward and away from one another between the inner and outer sides of the pans, and rods having their ends secured to the side portions of the hood and having their intermediate portions of sinuous form to provide a sinuous slot above the inner sides of the pans.

3. An insect collector embodying a pair of pans movable along opposite sides of a row of plants, an arch-like frame secured to and connecting said pans, an arch-like hood suspended loosely from the upper portion of said frame with its side portions movable toward and away from one another above the pans between the inner and outer sides thereof, and springs connecting the forward portions of the hood and pans to hold the side portions of the hood yieldably in place.

In testimony that I claim the foregoing as my own, I have hereto affixed my signature in the presence of two witnesses.

JAMES HOWARD FIKE.

Witnesses:
J. A. WILKINSON,
A. M. JONES.

Copies of this patent may be obtained for five cents each, by addressing the "Commissioner of Patents, Washington, D. C."